Nov. 30, 1965 D. DAY ETAL 3,221,109

TELEPHONE LINE SELECTION DEVICE

Filed Feb. 28, 1962 10 Sheets-Sheet 1

INVENTORS
Donald Day
Kiyomi Harano
BY Manfred M. Warren
Their Attorney

INVENTORS
Donald Day
Kiyomi Harano
BY Manfred M. Warren
Their Attorney

INVENTORS
Donald Day
Kiyomi Harano
BY Manfred M. Warren
Their Attorney

TELEPHONE LINE SELECTION DEVICE

Filed Feb. 28, 1962 10 Sheets-Sheet 4

INVENTORS
Donald Day
Kiyomi Harano
BY Manfred M. Warren
Their Attorney

INVENTORS
Donald Day
Kiyomi Harano
BY Manfred M. Warren
Their Attorney

Nov. 30, 1965 D. DAY ETAL 3,221,109

TELEPHONE LINE SELECTION DEVICE

Filed Feb. 28, 1962 10 Sheets-Sheet 6

INVENTORS
Donald Day
Kiyomi Harano
BY
Manfred M. Warren
Their Attorney

INVENTORS
Donald Day
Kiyomi Harano
BY Manfred M. Warren
Their Attorney

TELEPHONE LINE SELECTION DEVICE

Filed Feb. 28, 1962

INVENTORS
Donald Day
Kiyomi Harano
BY Manfred M. Warren
Their Attorney

Nov. 30, 1965 D. DAY ETAL 3,221,109

TELEPHONE LINE SELECTION DEVICE

Filed Feb. 28, 1962 10 Sheets-Sheet 9

INVENTORS
Donald Day
Kiyomi Harano
BY
Manfred M. Warren
Attorney

Nov. 30, 1965 D. DAY ETAL 3,221,109

TELEPHONE LINE SELECTION DEVICE

Filed Feb. 28, 1962 10 Sheets-Sheet 10

INVENTORS
Donald Day
Kiyomi Harano
BY Manfred M. Warren
Their Attorney

United States Patent Office 3,221,109

Patented Nov. 30, 1965

3,221,109
TELEPHONE LINE SELECTION DEVICE

Donald Day, Kentfield, Calif. (2600 Tice Creek Drive, Walnut Creek, Calif.), and Kiyomi Harano, 1339 Allston Way, Berkeley, Calif.

Filed Feb. 28, 1962, Ser. No. 176,218
14 Claims. (Cl. 179—90)

The invention relates to telephone dialing systems and mechanisms.

An object of the present invention is to provide a telephone line selection device of the character described which is of small and compact form designed for easy and rapid attachment to existing telephone dials for limiting the use of the telephone to which the device is attached to a preselected dialing area, thus preventing the making of unauthorized telephone calls of the long distance or zone message unit charge class.

Another object of the present invention is to provide a telephone line selection device of the character above which is all mechanical in its construction and operation, may be produced at modest cost, and is composed of durable parts capable of providing a long life of dependable and trouble-free operation.

A further object of the present invention is to provide a telephone line selection device of the character described which is designed for complete flexibility for all telephone exchanges in all parts of the country so that it may be readily adapted to meet the varying needs of individual subscribers in different areas.

The invention possesses other objects and features of advantage, some of which of the foregoing will be set forth in the following description of the preferred form of the invention which is illustrated in the drawings accompanying and forming part of this specification. It is to be understood, however, that variations in the showing made by the said drawings and description may be adapted within the scope of the invention as set forth in the claims.

Referring to said drawings (ten sheets):

Figure 1:
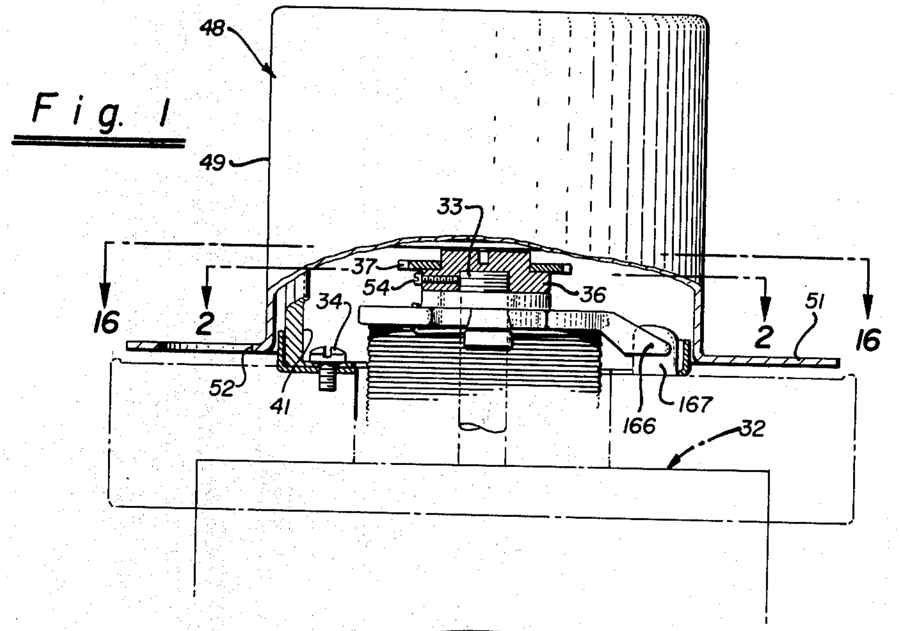
FIGURE 1 is a side elevation of a telephone line selection device constructed in accordance with the present invention and partially broken away to show internal construction.
Figure 3:
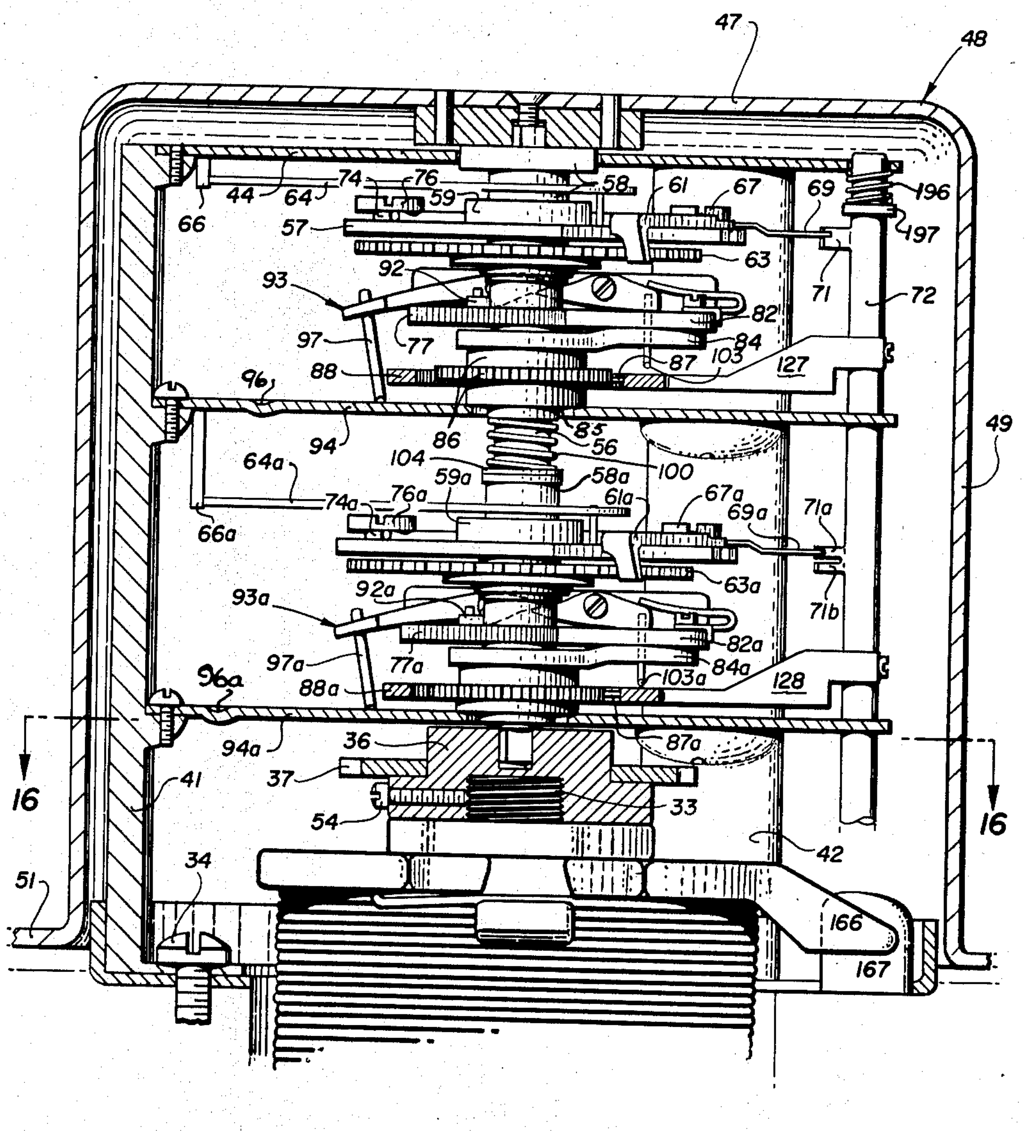
FIGURE 3 is a longitudinal cross-section of the device drawn on an enlarged scale and with certain of the central portions shown in elevation.
Figure 16:
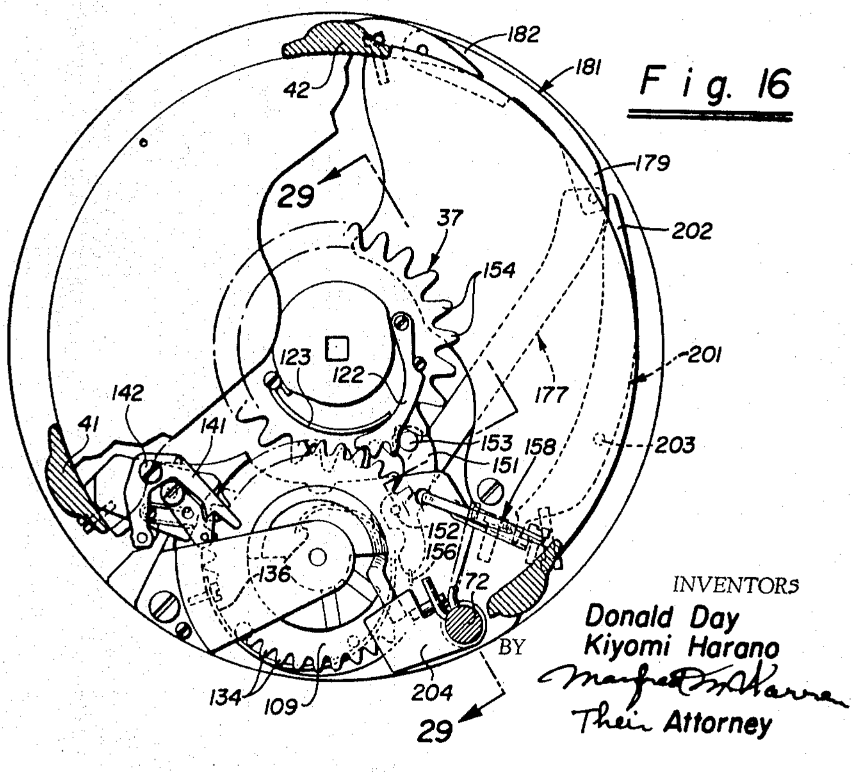

FIGURE 16 is a plan sectional view of a portion of the mechanism as taken on the plane of line 16—16 of FIGURE 3, the mechanism shown in FIGURE 16 being deleted from FIGURE 3 for clarity of illustration, the view being further indicated by section line 16—16 in FIGURES 1 and 3 for purposes of orientation.

Figure 17:
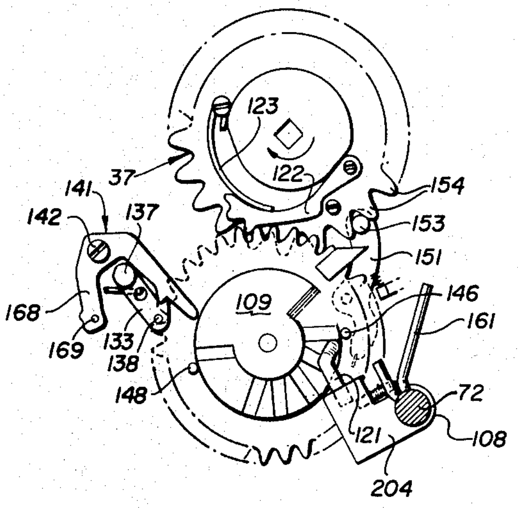

FIGURE 17 is a plan sectional view similar to FIGURE 16 showing a portion of the mechanism of FIGURE 16 in a different position of certain of the parts.

Figure 18:
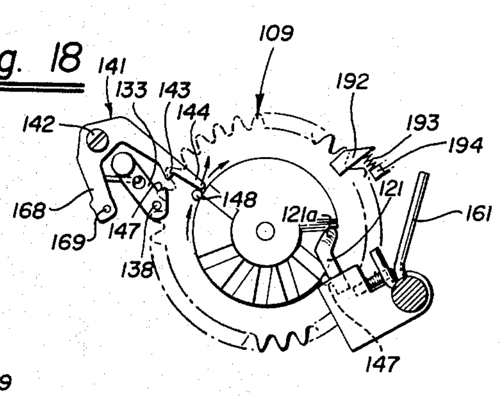

FIGURE 18 is a fragmentary plan sectional view similar to FIGURE 17 but showing certain of the parts in still another position.

Figure 19:
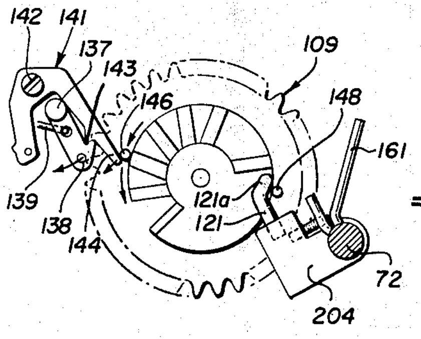

FIGURE 19 is a fragmentary plan sectional view similar to FIGURE 18 but showing the parts in another position.

Figures 20, 21, 22, 23, 24:
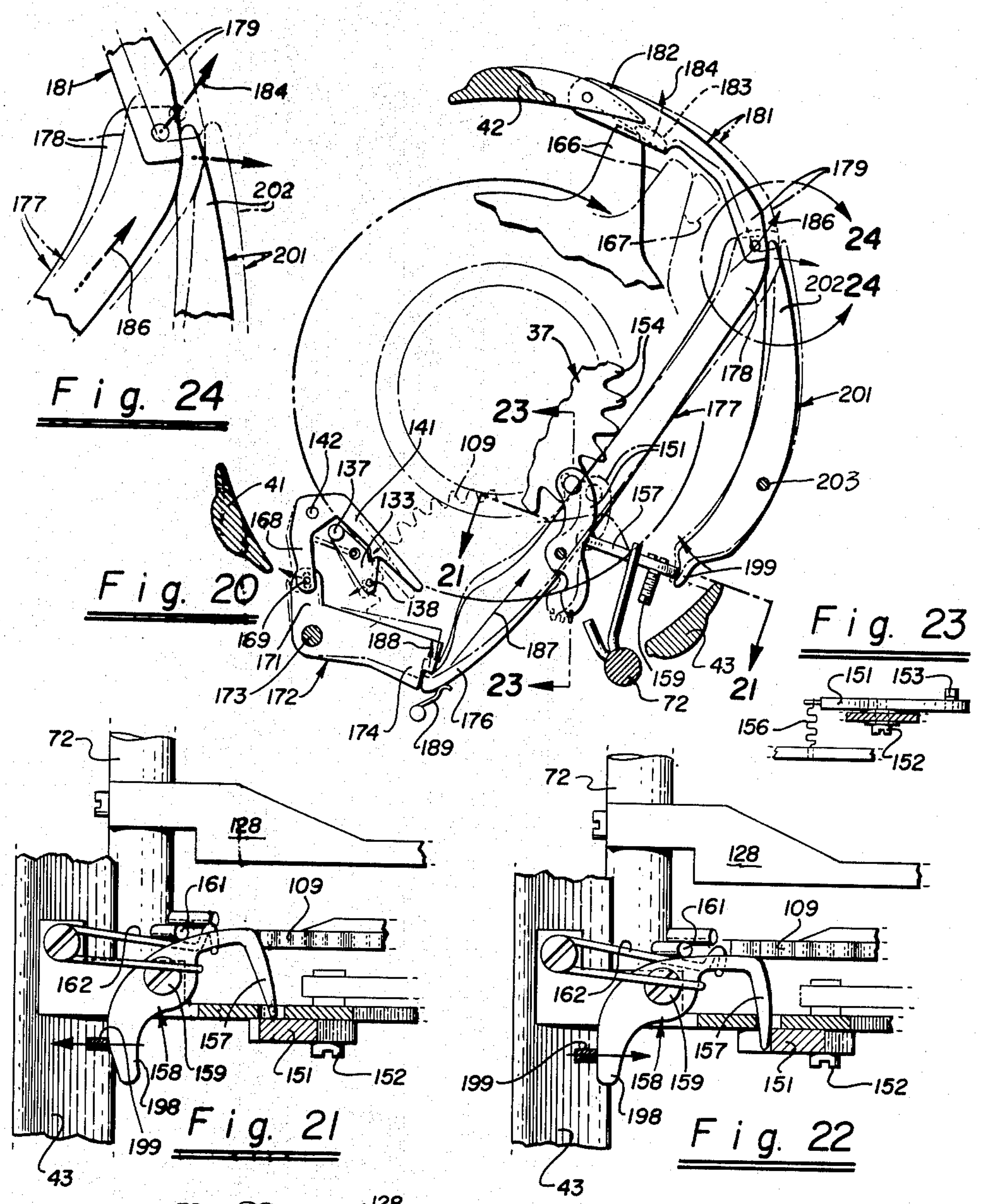

FIGURE 20 is a fragmentary plan sectional view similar to FIGURE 16 with certain of the parts deleted to show other parts in better detail.

FIGURE 21 is an enlarged fragmentary cross-sectional view taken substantially on the plane of line 21—21 of FIGURE 20.

FIGURE 22 is a fragmentary enlarged cross-sectional view similar to FIGURE 20 but showing parts in different position.

FIGURE 23 is a fragmentary cross-sectional view of the device taken substantially on the plane of line 23—23 of FIGURE 20.

FIGURE 24 is an enlarged fragmentary plan view of a portion of the mechanism indicated in circle 24 in FIGURE 20.

Figure 25:
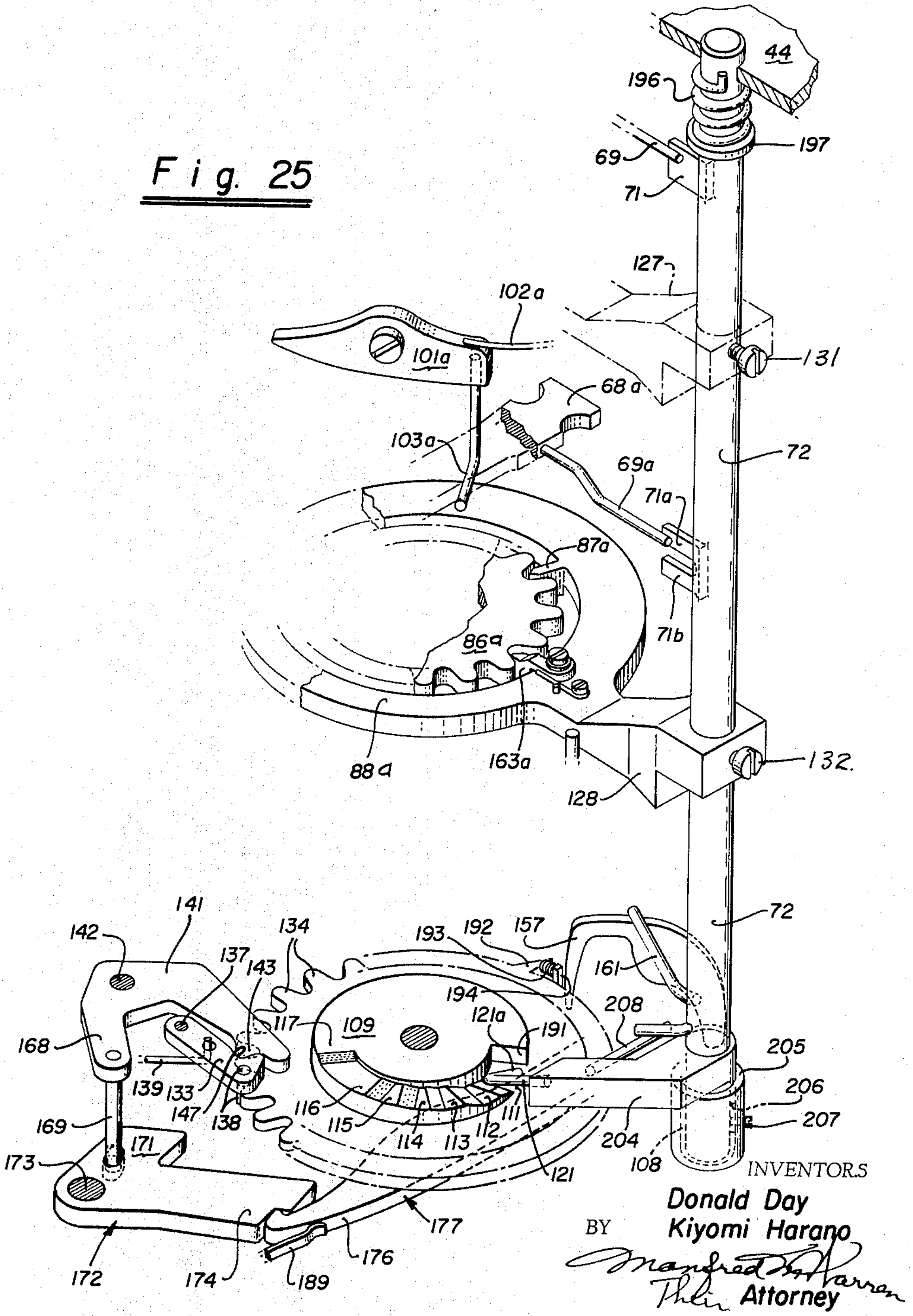

FIGURE 25 is a fragmentary perspective view of a portion of the mechanism.

Figure 26:
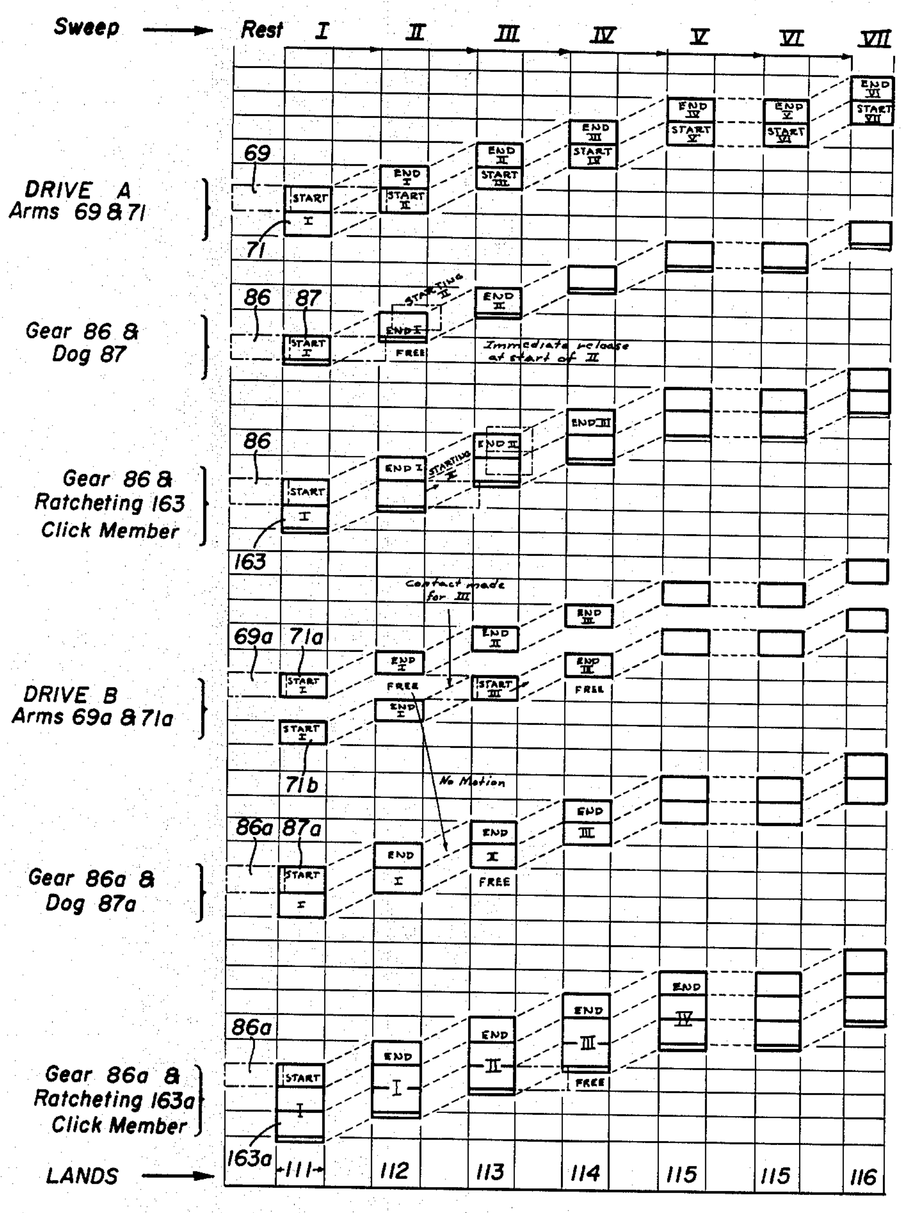

FIGURE 26 is a timing chart showing the interrelated positions of certain of the parts.

Figures 6, 7, 27, 28:
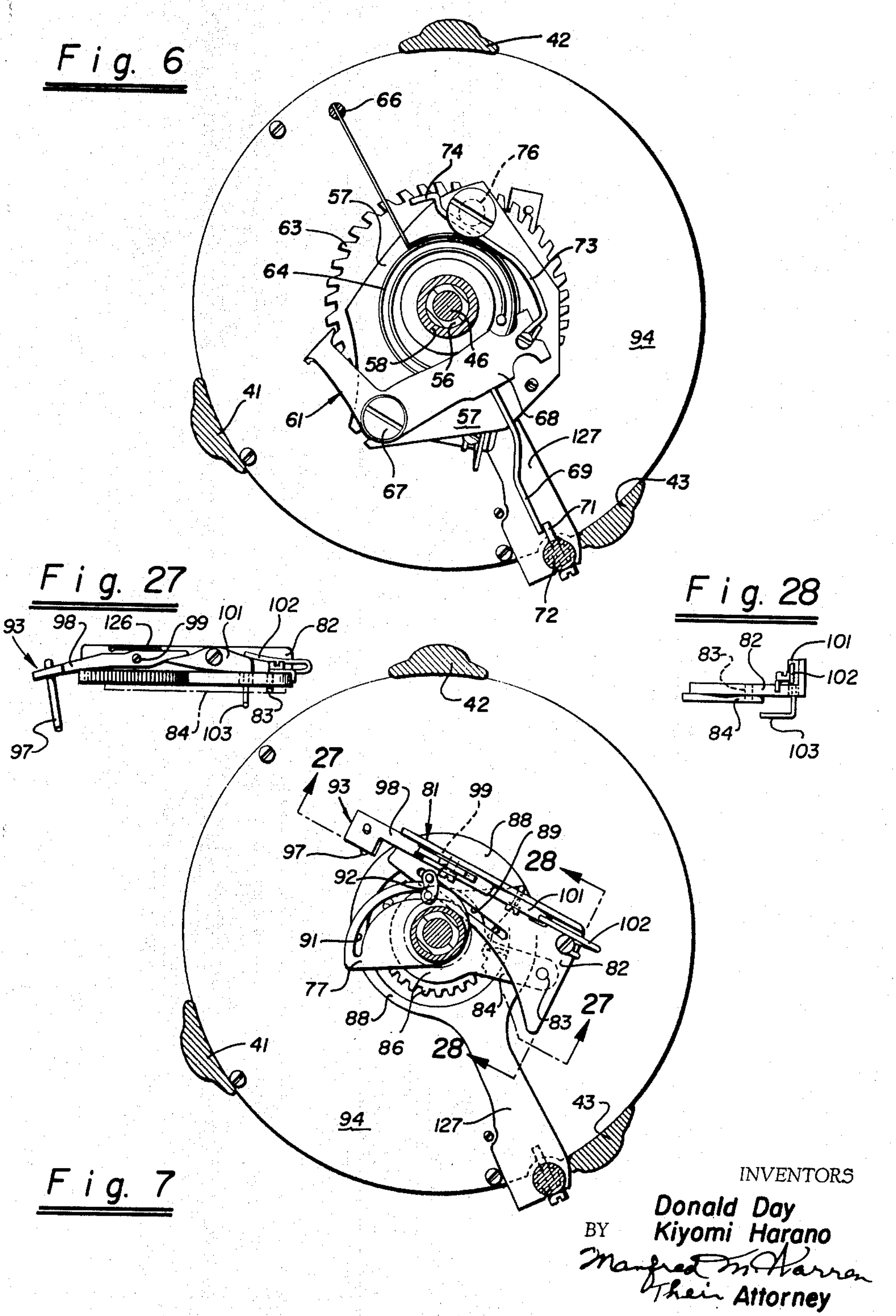
FIGURE 6 is a cross-sectional view taken substantially on the plane of line 6—6 of FIGURE 4.
FIGURE 7 is a cross-sectional view of the device taken substantially on the plane of line 7—7 of FIGURE 4.

FIGURE 27 is a fragmentary cross-sectional view taken substantially on the plane of line 27—27 of FIGURE 7.

FIGURE 28 is a fragmentary cross-sectional view taken substantially on the plane of line 28—28 of FIGURE 7.

Figure 29:
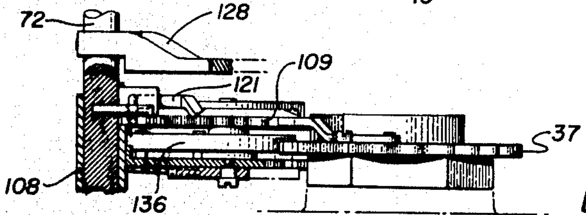

FIGURE 29 is a cross-sectional view taken substantially on the line 29—29 of FIGURE 16.

The telephone line selection device in the present invention is designed for use in conjunction with the usual telephone dial and means associated with it for effecting a telephone line selection upon movement of the dial through a plurality of passes wherein each pass is composed of forward and return dial sweeps through a discreet number of circumferentially spaced positions; and the means of the present invention is adapted for connection to the dial and may be programmed to permit dial motion to and form certain of these discreet positions only in each of the passes and is effective for blocking motion of the dial with respect to certain of such positions in at least one of the passes so as to preclude the dialing of certain numbers. More specifically, we provide devices for sensing of the rotation of the telephone dial in each of its first three passes in conjunction with a dial motion blocking means which is put in operation should the dial be rotated to a proscribed digit in any of the three passes. The first three digits in telephone dialing systems are used as routing paths taking the call through to a designated area or central office and enable the subscriber to make both local calls, that is to other subscribers within the same central office area, or to reach subscribers in other office areas or in other cities. The control of these first three digits, therefore, is vital to the use of the telephone in limiting that use to any designated area.

Figure 4:
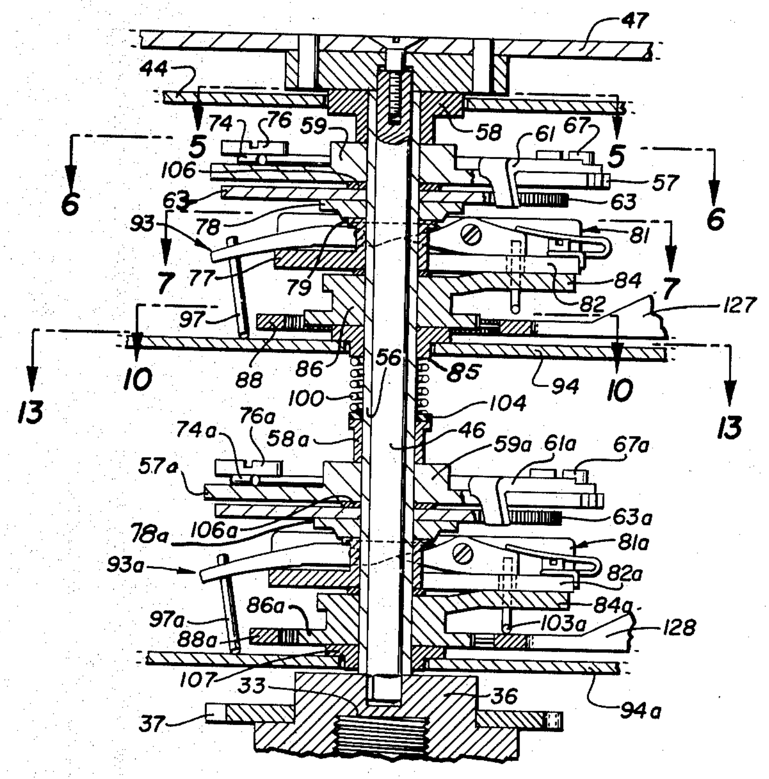
FIGURE 4 is a longitudinal cross-sectional view of the device similar to FIGURE 3.
Figure 5:
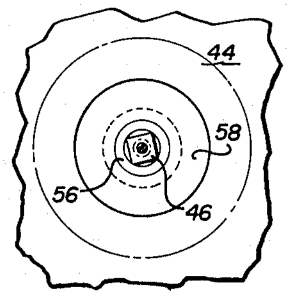
FIGURE 5 is a fragmentary cross-sectional view of the device taken substantially on the plane of line 5—5 of FIGURE 4.

With reference to the accompanying drawings, the telephone line selection device of the present invention is adapted for use with a telephone dial and the conventional means 32 for converting of dial motion into electric pulses which are sent over the telephone line for effecting line selection as is well known in the art. The present mechanism is assembled at the top of the conventional dial shaft 33 and is connected thereto and to face plate mounting screws 34, forming part of the stationary support of the rotating dial. Access to the dial shaft and the mounting screws 34 may be conveniently had by simply removing the conventional number plate, which is the usual center disc on the dial finger wheel, which exposes a nut used to secure the finger wheel. This nut may then be removed as well as the finger wheel itself. After removing the conventional finger wheel (not shown) we apply a nut 36, see FIGURES 1 and 3, and which in turn has fastened thereto for rotation with the dial shaft 33, a locking ratchet gear 37. The stationary support for the present mechanism is obtained from the three face plate screws 34, see FIGURE 2, and consists of three posts 41, 42 and 43 which are secured to the screws by in-turned feet on the posts, see FIGURES 2 and 3. This stationary support is carried vertically, that is axially of the dial shaft by the three concentrically arranged posts 41, 42 and 43 to a top disc 44, see FIGURES 3 and 4, which also provides a center support for the upper end of a dial shaft extension 46, see FIGURE 4, which extends as a one piece shaft from the top of nut 36 to above the top disc 44 where the upper end of shaft 46 is secured to the center of an end 47 of an inverted cup-shaped cylindrical enclosure 48 having a cylindrical side wall 49, see FIGURE 3, surrounding in concentric fashion the shaft 46 and which extends to a flanged circular base 51 here formed with the conventional circumferentially spaced finger openings 52 to provide the dial finger wheel, it being noted that this flanged finger wheel directly overlies the usual number plate on the telephone in position for movement of the subscriber's dialing finger in any one of openings 52 and against the conventional finger stop 53. With reference to FIGURE 4, it will be noted that the lower end of shaft 46 is keyed into the top of nut 36 so that rotation of the finger wheel 51 will transmit rotation through the walls 49 and 47 of the enclosure 48 to the upper end of dial shaft extension 46 and then to nut 36 and to the dial shaft 33 for operation of the conventional electric pulsing mechanism 32. Nut 36 may be secured to dial shaft 33 by set screw 54 as shown in FIGURE 3.

Assembled along the shaft extension 46 and within the enclosure 48 are a series of mechanisms generally illustrated in elevation in FIGURE 3 and in cross-section and FIGURE 4 which cofunction to sense the rotation of the dial in its several passes and which also include the aforementioned dial motion blocking means as well as a manually controlled releasing means for the blocking means so that the telephone may be freed for the next call. As will be seen from FIGURE 4, these several devices are assembled on a sleeve 56 which is frictionally driven by the shaft 46, but is also permitted relative rotation. With reference to FIGURES 3, 4 and 6, there is mounted adjacent the upper end of sleeve 56 a disc plate 57 which is journaled on the sleeve 56 and is driven by a hold down washer 58 which is mounted in compression between the underside of enclosure end 47 and a central hub 59 on plate 57. Pivotally mounted on plate 57, is a ratchet arm 61 which may be swung into engagement with the teeth of an underlying ratchet gear 63 which is also journaled for rotation on the sleeve 56 so that a clockwise rotation of plate 57, as viewed in FIGURE 6, will be accompanied by a clockwise rotation of ratchet gear 63. This clockwise rotation of plate 57 corresponds to the forward pass of the telephone dial and is here resisted by a coil spring 64 surrounding the sleeve 56 and having its opposite ends as secured to plate 57 and to a stationary support 66. On the return movement of the dial, plate 57 is urged in a counterclockwise direction by spring 64. The ratchet teeth and ratchet member 61 are so formed as to permit the ratchet to move out of engagement with the teeth and permit return rotation of plate 57. The ratchet member is here pivoted to plate 57 by a screw 67, and is formed with a second arm 68 which carries an outstanding feeler or finger member 69. In the position of rest of the parts, as illustrated in FIGURE 6, the outer end of the finger 69 is juxtaposed to an arm 71 carried by a vertically reciprocating post 72 and which determines on the return movement of plate 57 whether ratchet 61 re-engages with the ratchet teeth. A vertical positioning of post 72, as illustrated in FIGURES 3 and 25, positions arm 71 to engage the end of finger 69, thereby swinging the ratchet 61 into re-engagement with the ratchet teeth on return movement of plate 57. On the other hand, when post 72 is moved vertically to misalign arm 71 with finger 69, see FIGURE 3, ratchet 61 will remain out of engagement with the ratchet teeth on subsequent forward movement of the dial on the next pass. Preferably, a spring 73 is used to positively locate the ratchet member in one of its two positions. As here shown, spring 73 is in the form of a flat leaf spring secured at one end to ratchet arm 68 and is slidably engaged at its opposite end 74 with a pin 76. The combination of friction of the sliding engagement of spring 73 with pin 76 and the resilience of the spring co-operating with the other parts, as illustrated in FIGURE 6, function to provide the ratchet member with its two positions as above discussed.

Figures 8, 9, 10, 11, 12:
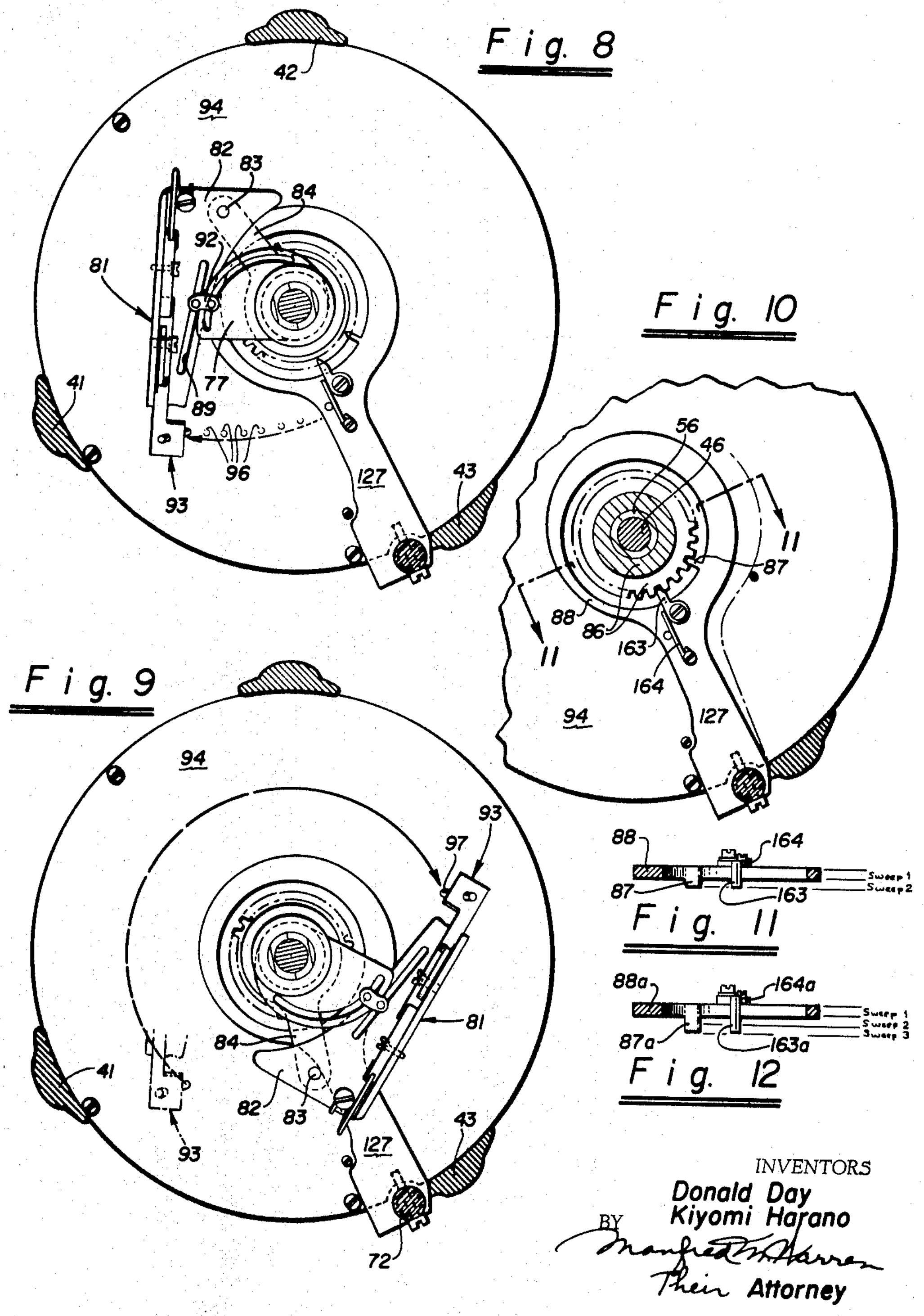
FIGURE 8 is a cross-sectional view similar to FIGURE 7 but showing the parts in their respective positions at the conclusion of a first dial sweep.
FIGURE 9 is a cross-sectional view of the device similar to FIGURES 7 and 8 but showing the location of the parts at the end of a second dial sweep.
FIGURE 10 is a cross-sectional view of the device taken substantially on the plane of line 10—10 of FIGURE 4.
FIGURE 11 is a fragmentary cross-sectional view of one of the parts illustrated in FIGURE 10, and is taken substantially on the plane of line 11—11 of FIGURE 10.
FIGURE 12 is a cross-sectional view of another part similar to the part illustrated in FIGURE 11.

With reference next to FIGURES 3, 4 and 7, it will be seen that ratchet wheel 63 is used to drive a cam 77 which is also journaled for rotation on sleeve 56 below gear 63 and is frictionally driven by the gear by an inner posed friction disc 78 which is mounted in compression between the underside of gear 63 and the upper end of a center hub portion 79 formed on the cam. Cam 77 is here used to swing out an arm assembly 81 which has a normal position of rest, as illustrated in FIGURE 7, and an outwardly swung or displaced position, as illustrated in FIGURE 8. Arm assembly 81 includes a base plate 82 which is pivoted by pin 83 to an arm extension 84 formed as part of a gear 86 also journaled on sleeve 56, see FIGURES 4 and 10, against a friction washer 85. Gear 86 may be held stationary by a dog 87 formed on a ring member 88, and when the gear is so anchored against rotation it provides a stationary support for the pivot for the arm assembly 81.

Figure 13:
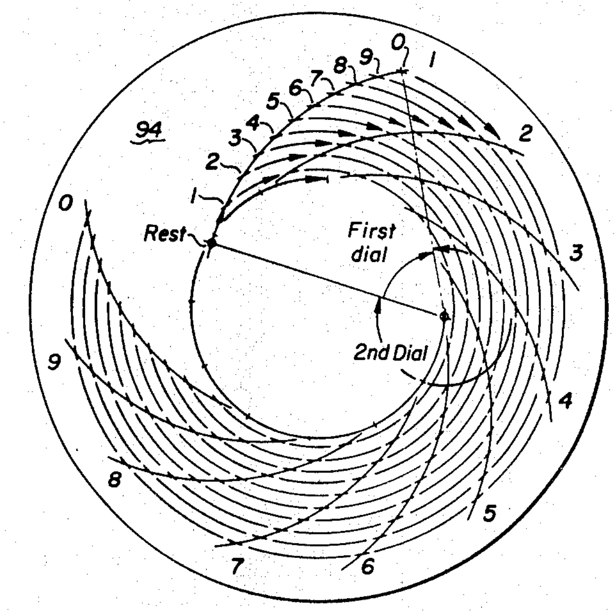
FIGURE 13 is a diagrammatic layout of one part of the device as seen at the plane of line 13—13 of FIGURE 4.

With reference to FIGURE 7, it will be seen that base plate 82 is formed with a slot 89 and the cam 77 is formed with a spiral shaped cam slot 91; and there is fitted into these two slots a link slide 92 which causes joint clockwise rotation of the two connected members; that is, when cam 77 is rotated in a clockwise direction, the base plate 82 of the arm assembly will be swung also in a clockwise direction around its pivot 83. In the present device this action takes place in the first forward pass or sweep of the dial, and arm assembly 81 is accordingly swung out by a distance corresponding to the digit number dialed. With reference to FIGURE 13, the several positions of the outer free end 93 of the arm assembly are illustrated on an underlying plate 94 corresponding with the position of rest of end 93 and the successive positions at which this end will be located after the dial has moved in its first forward pass in the dialing of digits 1 to 0 respectively. Plate 94 is formed at each of these terminal positions with a recess or opening 96 which is dimensioned to receive the lower end of a pin 97 carried by an arm 98 pivoted by pin 99 to the base plate 82, the outer end of arm 98 providing the outer end 93 of the arm assembly aforesaid and the pin 97 depending therefrom for engagement in any one of the recesses 96 provided in the underlying plate 94.

Figures 14, 15:
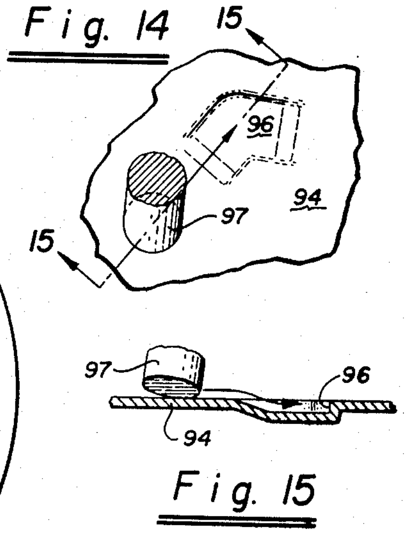
FIGURE 14 is a fragmentary plan view on an enlarged scale of a portion of a plate illustrated in FIGURE 13 showing a portion of a detent and associated detent opening.
FIGURE 15 is a fragmentary cross-sectional view of the portion illustrated in FIGURE 14 and is taken substantially on the plane of line 15—15 of FIGURE 14.

With reference to FIGURE 27, it will be noted that arm 98 is normally biased to a downwardly rotated position engaging pin 97 against plate 94 by an intermediate actuating lever 101 which is in turn engaged by spring 102. Lever 101 is formed with a depending arm 103 which may be engaged and displaced by the underlying ring member 88 to rock lever 98 in a clockwise direction, as viewed in FIGURE 27, so as to release pin 97 from an engaged position in one of the recesses 96 when it is desired to return the parts to starting position. Accordingly, it will be seen from the foregoing that the first forward pass of the dial is accompanied by a swinging out of the arm assembly 81 to one of the arcs 1–0 illustrated in FIGURE 13 and a latching in of the arm assembly in that orbit during the return movement of the dial, permitted by the slipping engagement connection between cam 77, sleeve 56 and dial shaft 46. At the start of the second sweep of the dial, ring member 88 is displaced vertically disengaging dog 87 from gear 86 thus releasing this gear for rotation with the dial shaft. Accordingly, the cam and whole dial assembly, as seen in FIGURES 7, 8 and 9, will rotate as a unit with gear 86 and this rotation will carry the outer end 93 of the arm assembly in a circular arc, as illustrated in FIGURE 13. The arcuate displacement of arm end 93 will, of course, depend upon the digit dial and there is illustrated in FIGURE 13 the loci of another series of recesses 96 which are located at the intersections of the arcuate sweep lines heretofore identified as 1 to 0, a set of spiral loci lines also marked 1 to 0 for identification in FIGURE 13. As will be apparent from this figure, if the first number dialed was 5, the arm end 93 would swing out to position marked 5 on loci line 1. If the next digit dialed was 6, then arm end 93 would be carried in a circular orbit in arc number 5 to loci line marked 6 and in each of these terminal positions of the arm, pin 97 would find a recess 96. With reference to FIGURE 15, it will be noted that recess 96 is so formed as to admit pin 97 and prevent its return movement while permitting its forward movement so that in each case the pin, while progressing in a forward direction may successively move into engagement with and then disengagement from each of the recesses 96. After the arm end 93 has reached one of the loci lines 1–0 in FIGURE 13 and has engaged in one of the recesses 96 therein, the cam and arm assembly remain relatively stationary and inactive during the balance of the dialing operation up sweep 7 when the assembly is released for returning to rest position, sweep 7 being the end of the dialing sequence presently in use and hence here contemplated.

A second operating unit or assembly substantially identical in all respects to the operating assembly above described is repeated on sleeve 56 at a lower elevation and for purposes of identification includes a hold down washer **58*a* which is engaged by a friction shoulder or collar 104 mounted around sleeve 56 and which engages the hub 59*a* of disc plate 57*a* which in turn carries a ratchet arm assembly 61*a* which engages a subjacent gear 63*a*, here driven by an interposed friction washer 106*a*, a similar washer 106 being provided in the first described assembly, friction disc 78*a*, cam 77*a*, extensible arm assembly 81*a*, underlying supporting gear 86*a* and surrounding ring member 88*a*. It will be noted that the lower end of sleeve 56 is supported in a bearing member 107 here carried by plate 94*a* which corresponds with plate 94 above described. This second operating unit is mounted in compression by a stabilizing torque and tension spring 100 here mounted in compression between friction washer 85 and hold down washer 58*a***.

In the operation of the present device both rack arm assemblies 81 and **81*a* are swung out to orbit on the first sweep of the dial. Arm assembly 81 only, however, is rotated in orbit during sweep 2 of the dial while arm assembly 81*a* holds stationary. Arm assembly 81*a* only rotates in an orbit during sweep 3 of the dial while arm assembly 81 holds steady during this sweep. If the pin ends of the dial assemblies find recess openings 96 and 96*a*, as the case may be, at each one of the terminal positions during sweeps 1, 2 and 3, dialing is permitted to continue. If, on the other hand, one of the pin ends fails to find such a recess at such a terminal position, further dialing is prevented. Thus, the device may be preset for each installation to control permissive and proscribed dialing operations. For example, in the city of Oakland, California, GLencourt 1 is a local exchange, while GArfield 1 is a toll call exchange in San Francisco, and GLenwood 3 is a toll call to Marin County. If the latter two areas were to be restricted while the first was to be permitted in the dialing operation of a given telephone in the Oakland area, there would be provided in each of the rack plates 94 and 94*a* a recess 96 at the fourth orbit corresponding with the dialing of the prefix G. Another such recess would be provided on the fifth loci line of orbit 4 which would correspond to the dialing of the prefix L in the second dial sweep. So far this would permit the dialing of either Glencourt or Glenwood. However, no recess would be provided in the dial plate at the second loci line of orbit 4 which would correspond with the dialing of the prefix A on the second sweep, thus discriminating against dialing of the Garfield exchange. Discrimination between Glencourt and Glenwood exchanges occurs on the third sweep by the placing of a recess 96 at loci line 1 of orbit 4 in plate 94*a*, it being remembered that in the third sweep it is the lower arm assembly which is in operation, and no recess is provided at loci line 3 in orbit 4 which would be the terminal position of arm end 93*a* upon dialing the digit 3 in the third dial sweep. Since, as above explained, the first three sweeps of the dial constitute the routing paths to the telephone area being dialed, the present device can be readily set by the provision or omission of recesses 96 and 96*a*** to establish permissive and proscribed dialing. Thus with the apparatus of the present invention applied to telephones desired to be so restricted, unauthorized long distance dialing by unauthorized persons is effectively prevented.

The programming operation of the two assemblies above described and the locking up of the dial when a proscribed prefix digit is dialed, is controlled by the vertically mounted and vertically reciprocating post 72 referred to above. This post is journalled at its lower end in a supporting sleeve 108, see FIGURE 25, attached to lift arm base 204 which in turn is enclosed in a stationary based sleeve 205. Supporting sleeve 108 is provided with a slot 206 to receive pin 207 mounted on stationary sleeve 205 to arrest any rotational movements of lift arm base 204 and yet permit vertical reciprocating and rotational movements of post 72. Post 72 is also supported through openings provided in plates 94 and **94*a*, see FIGURE 3, the plates themselves being fastened at their periphery to the three upstanding mounting posts 41, 42 and 43. Mounted adjacent the lower end of post 72 is a counting wheel 109 which is successively stepped ahead in each sweep of the dial and is connected to post 72 to regulate its vertical positioning accordingly. A series of cam steps 111, 112, 113, 114, 115 and 116 are provided on the upper face of the counting wheel 109, see FIGURE 25, and which are engaged by the lower end 121*a* of a lift arm 121 connected to post 72 through arm 208 so that the post is successively raised at the beginning of the first, second, third, fourth and seventh sweeps of the dial. Rotation of counter wheel 109 is effected by a ratchet arm 122 carried by the locking ratchet gear 37 secured to nut 36 on the dial shaft 33 (see FIGURES 3 and 17). As illustrated in FIGURE 17, it will be seen that rotation of gear 37, in a clockwise direction, will cause a stepped rotation of gear 109 in a counterclockwise direction by one tooth on gear 109, it being noted that ratchet arm 122 is urged into engagement with gear 109 by spring 123 to provide the ratcheting action noted. As will be seen from FIGURES 17 and 25, land 111 and an adjacent upslope have a circumferential width corresponding to one tooth of the gear so that the post is raised at the beginning of the first dial sweep to the elevation of land 112. At the beginning of the second dial sweep there is a similar upslope provided adjacent to the second land 112 which carries the lift arm and post upwardly at the beginning of the second sweep to the elevation of land 113. Similarly, at the beginning of the third sweep it will be noted that there is an upslope adjacent land 113 which will carry the lift arm and post to a third elevation corresponding to land 114. Again, at the beginning of the fourth sweep there is an upslope adjacent land 114 which carries the lift arm up to land 115 which extends circumferentially for a distance keeping the post in this elevation during the fourth, fifth and sixth sweeps. At the beginning of the seventh sweep it will be noted that there is again an upslope to land 116** which carries the lift arm and post to this latter elevation at the beginning of the seventh sweep.

The programming of the cam and arm assemblies 81 and 81*a* for their respective operations during the first, second and third sweeps is controlled by arm 71 on post 72 and its engagement with arm 69, as above explained, and by equivalent arms 71*a* and 71*b* on post 72 which similarly engage arm 69*a*. As hereinabove noted, if on the return sweep of the dial, arm 69 engages arm 71, see FIGURE 6, ratchet arm 61 will be moved into engagement with one of the teeth of ratchet gear 63 thereby causing rotation of the cam 77, see FIGURE 7, in the next forward pass of the dial. If, on the other hand, arm 69 is not engaged by arm 71 at the return movement of the dial, ratchet 61 will remain out of engagement with teeth of gear 63 and no rotation of cam 77 will take place on the next forward movement of the dial. With reference to FIGURES 3 and 25, it will be seen that in the normal starting position of post 72 arm 71 is positioned at the elevation of arm 69, and arm 71*a*, see FIGURE 26, is positioned at the elevation of arm 69*a*. It will be noted that post 72 is moved to this starting elevation by the return of counting wheel 109 to its starting position after the seventh sweep, which is subsequently described. Consequently, on the return movement of the seventh sweep, arms 69 and 69*a* will be engaged by arms 71 and 71*a*, see FIGURE 3, to engage ratchet arms 61 and 61*a* with their respective gears for operation of the cam and arm assemblies in the forward sweep of the dial in dialing the first digit. However, almost immediately, see FIGURES 17 and 25, the counting wheel is stepped one tooth which raises the lift arm and post to land 112. Consequently, on the return of the dial after dialing the first digit, post 72, see FIGURES 3 and 25, has moved up one step so that arm 69 will be engaged by arm 71, but arm 69*a* will not be engaged by either arms 71*a* or 71*b* which are spaced apart by distance of the second elevation of the post. Under such circumstances, only the upper cam and arm extension assembly is actuated during the dialing of the second digit. However, almost immediately after beginning of the dialing of the second digit, see FIGURES 17 and 25, the counting wheel is stepped ahead to elevate the lift arm 121 and post 72 to the elevation of land 113. This elevation of the post brings arm 71*b* into juxtaposition with arm 69*a* and lifts arm 71 out of registration with arm 69. Consequently, at the end of the dialing of the second digit, the lower cam and arm assembly is put in operation for rotation through its arcuate displacement as above described while the upper assembly remains in its position at the end of the second dialing sweep. However, again almost immediately after starting the dialing of the third digit, the counting wheel 109 is again rotated one step to lift the post 72 to a fourth position (land 114) raising arm 71*b* above arm 69*a*. Accordingly, as the assembly returns at the end of dialing of the third digit, arm 69*a* is not engaged to re-engage ratchet arm 61. Accordingly, no further displacement of the cam and arm assembly takes place during the dialing of the fourth digit and land 115 on counting wheel 109 continues circumferentially to hold post 72 in this position during the balance of the dialing until the beginning of the seventh sweep when the post is carried up to the elevation of land 116.

The elevation of post 72 to land 116 effects a disconnection of the pins 97 and 97*a* from their associated recess 96 and 96*a*, see FIGURES 3, 14 and 15, thereby releasing the driving cam 77 for return movement under the action of spring 64 which in turn retracts the arm assembly to its starting position. With reference to FIGURES 25, 27 and 28, the counter-clockwise rotation of lever 101 will enable lever 98 to follow in a clockwise direction under the urge of biasing spring 126 so as to elevate pin 97 out of engagement with its associated recess 96. This is here accomplished by the raising of ring members 88 and 88*a* so as to engage foot 103 provided on lever 101. As will be seen from FIGURES 3, 7 and 25, ring members 88 and 88*a* are formed with horizontally extending arm portions 127 and 128 which extend to post 72 and are fastened thereto by screws so as to provide a joint vertical reciprocation of these connected parts. Accordingly, when post 72 is elevated in the seventh dial sweep to land 116, ring members 88 and 88*a* are carried upwardly and engage with the depending feet 103 and 103*a* on levers 101 and 101*a* to cause the aforementioned counterclockwise movement of these levers, see FIGURE 27, to elevate pins 97 and 97*a* out of engagement with their respective recesses 96 and 96*a*, thereby releasing the arms and cams for return to starting position under the action of springs 64 and 64*a*.

Counting wheel 109 is successively held in its several advanced positions during the succeeding sweeps of the dial, but is also automatically returned to its starting position during the seventh dial sweep. This is here accomplished by a ratchet arm 133 which cooperates with the teeth 134 of the counter wheel gear 109 so as to hold the counting wheel in its progressively advanced positions, but which arm 133 is displaced during the seventh dial sweep to release the counting wheel to return to its starting position under the influence of a clock style spring 136 connected to the wheel 109, see FIGURES 17, 25 and 29. As here shown, ratchet arm 133 is pivoted at one end by pivot pin 137 for swinging movement of a pin 138 carried at its opposite end into and out of engagement with teeth 134. Arm 133 is biased in a direction engaging pin 138 in the teeth by spring 139, it being noted from FIGURES 18, 19 and 25 that arm 133 will be deflected in a clockwise direction during the advancing movement of the counting wheel 109, but will on each advance, drop into position behind one of the teeth 134 so as to prevent return clockwise movement of the wheel. Displacement of arm 133 in a clockwise direction, as viewed in FIGURES 18, 19 and 25, is here effected by lever 141 which is appropriately engaged by the counting wheel 109 and in turn engages lever 133. As here shown, lever 141 is pivoted at 142 so as to swing a mid portion 143 of the lever against arm 133, see FIGURES 18, 19 and 25, when lever 141 is displaced in a clockwise direction about its pivot 142. Such displacement is here effected by the engagement of the outer free end 144 of lever 141 by a shoulder 146 provided on the counting wheel in position to engage lever end 144 and so displace it during the seventh sweep of the dial, see FIGURE 19. The mid portion of 143 of lever 141 is here formed as a tit which fits into a specially formed recess 147 in arm 133 so as to hold arm 133 in a clockwise displaced position, as illustrated in FIGURES 18, 19 and 25, during the period of return clockwise motion of the counting wheel 109. As the latter returns to starting position, see FIGURES 18 and 19, another shoulder 148 on the counting wheel 109 engages lever end 144 and rotates lever 141 in a counter-clockwise direction thus removing tit 143 from recess 147 and permitting ratchet arm 133 to spring back into engagement with the teeth of the counting wheel for proper ratchet operation in the next operating cycle of the dial.

In accordance with the present invention, if the operator dials a proscribed digit during any of the first three passes of the dial, the dial apparatus is rendered inoperative for further dialing operation. In the present construction, this inoperativeness is obtained by locking the dial shaft, and when this occurs the only way of releasing the dial shaft for further operation is to advance the dial to its extreme clockwise position by dialing the digit zero, which in the present construction is arranged to release all of the internal parts for automatic return to starting position. With the reference to FIGURES 10, 11 ,12, 25 and 26 it will be observed that gear 86 which provides the pivot mounting for base plate 82, see FIGURE 7, is normally held against rotation or released for rotation by dog 87, see FIGURES 10 and 25, in the case of gear 86 and dog **87*a* in the case of gear 86*a*. In the rest position of the parts at the beginning of dialing operation, ring members 88 and 88*a* are at elevations engaging dogs 87 and 87*a* in the teeth of gears 86 and 86*a*. Accordingly, and as above explained, during the first sweep of the dial the arm assemblies 81 and 81*a* are carried outwardly about stationary pivots 83 and 83*a*. If pins 97 and 97*a* failed to find recesses 96 and 96*a* at their terminal positions corresponding with the first digit dialed, the arm assemblies 81 and 81*a* will tend to return together with cams 77 under the urge of springs 64 and 64*a* and the return frictional movement of the dial. Accordingly, gears 86 and 86*a* will tend to rotate in a counterclockwise direction, as viewed in FIGURE 10, which in turn imparts a clockwise direction of rotation of the ring members 88 and 88*a* secured to post 72**, this clockwise displacement being indicated in dashed lines in FIGURE 10.

The operating connection between post 72 and the dial shaft to effect a locking up of the dial shaft upon this clockwise displacement of the shaft is best shown in FIGURES 20, 21 and 22. With reference to the latter named figures, it will be seen that there is provided at gear 37 on dial shaft 33 a free acting ratchet arm 151 which is pivoted at pivot pin 152 to a stationary part of the frame for swinging oscillating movement of a roller 153 carried by one end of the lever into and out of engagement with the teeth 154 of gear 37, as best viewed in FIGURE 23. Lever 151 is biased by spring 156 connected thereto which constantly urges roller 153 into mesh with teeth 154. Normally ratchet arm 151 will permit free movement of the gear 37 into either a clockwise or counterclockwise direction, the arm 151 freely oscillating in and out of engagement with the teeth 154. However, in the present construction rotation of post 72, as above explained, will place a stop 157 behind lever 151 so as to trap it in mesh with gear teeth 154 thus restraining rotation of dial shaft 33. As here shown, stop 157 is formed as one end of a lever 158, see FIGURES 21 and 22, pivoted by pin 159 in position for engagement and displacement by an arm 161 on post 72, arm 161 being swung in a clockwise rotation of post 72, as seen in FIGURE 20, onto lever 158 causing lever end 157 to move downwardly behind lever 151, see FIGURE 22. Normally, that is when arm 151 is not riding upon lever 158, the latter is displaced in a counterclockwise direction, as viewed in FIGURE 21, by spring 162 so as to elevate the lever end 157 above and out of engagement with ratchet arm 151. It will thus be seen that rotation of the post 72 in a clockwise direction, as viewed in FIGURE 10 of the drawing, will be accompanied by a locking up of rotation of the dial shaft.

A similar rotation of the post 72 is effected if the operator dials a proscribed digit in either of the second and third passes. In the second sweep of the dial, as has been heretofore observed, ring member 88 is elevated to move dog 87 out of engagement with the teeth of gear 86 to permit rotation of this gear and the connected cam and arm assembly in a circular orbit. There is, however, provided between ring member 88 and gear 86 an operating connection which will effect the aforementioned clockwise direction of movement of the ring member should pin 97 fail to find a recess 96 at the end of its circular motion corresponding to the end of the forward pass of the second dial sweep. This operating connection is here composed of a ratcheting click member 163 carried by the ring member 88 and which engages in the teeth of gear 86 so as to permit a clockwise rotation of the gear only, as seen in FIGURE 10. Accordingly, if pin 97 fails to find a recess 96 at the end of its travel, ratchet member 163 will interlock with gear 86 and the return thrust of the parts is imparted to ring member 88 causing its clockwise displacement, as viewed in FIGURE 10. As will be seen in FIGURE 10, the outer end of the ratcheting click member 163 is bevelled so as to freely permit relative clockwise rotation of gear 86 with respect to the ring member 88, the click member 163 being biased in this action by spring 164. However, the bevelled shape of the outer end of click member 163 will prevent the return counterclockwise motion of gear 86. With reference to FIGURE 11, it will be seen that the ratcheting click member 163 has a depth sufficient to retain the outer end of member 163 in engagement with the teeth of gear 86 in the elevation of the ring member 88 to the second sweep of the dial. Note in FIGURE 11 the two relative depths labeled sweep 1 and sweep 2 which correspond with the relative elevations of the ring member 88 in the first and second dial sweeps. While ratcheting click member 163 is in engagement with gear 86 in the first sweep of the dial, it will be noted that the gear 86 is locked against relative rotation in this dial sweep by dog 87 so that ratcheting click member 163 is not called upon for operation. However, it is retained in engagement with the teeth of gear 86 upon movement of the ring member to the second sweep elevation, as depicted in FIGURE 11, so as to function as above explained in the second dial sweep.

With reference to FIGURE 12, it will be noted that the companion ratcheting click member **163*a* has a greater depth so as to extend downwardly to the sweep three elevation, as depicted in FIGURE 12, so as to remain in engagement with the teeth of gear 86*a* and thus be operable during the third dial sweep, when ring member 88 has moved upwardly to disengage the ratcheting click member 163. With further reference to FIGURE 12, it will be noted that dog 87*a* is extended downwardly to lie in the second sweep elevation of ring member 88*a*. Accordingly, in the second sweep of the dial, gear 86*a* is retained against rotation by dog 87*a*, but when the parts are positioned for the third dial sweep, dog 87*a* will be elevated out of engagement with the teeth of gear 86*a* thus permitting gear 86*a* to rotate under the control of ratcheting click 163*a*. Thus, if the pin 97*a* fails to find a recess 96*a* at the end of its travel in the third sweep, ratchet member 163*a* will interlock with gear 86*a* and the return thrust of the parts is imparted to ring member 88*a* causing its clockwise displacement, as viewed in FIGURE 25, and an accompanying clockwise displacement of post 72** causing a locking up of rotation of the dial shaft, as above explained.

Figure 2:
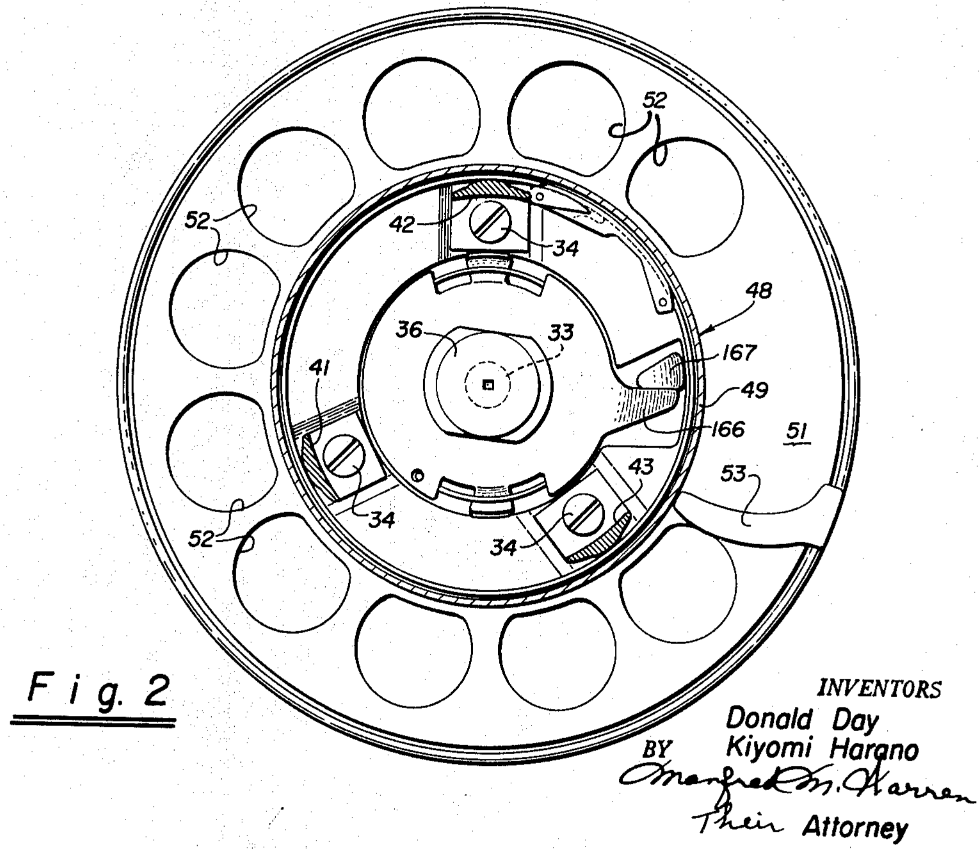
FIGURE 2 is a cross-sectional view of the device taken substantially on the plane of line 2—2 of FIGURE 1.

With reference to FIGURE 22, it will be noted that the dial shaft may be released only by removing arm 161 from its engaged position on lever 159, thus permitting the lever to rock about its pivot 158 under the action of spring 162 and remove the end 157 from behind the ratchet arm 151, see also FIGURE 20. This is arranged to be done by a momentary elevation of the post 72 as it is returned to starting position by the counting wheel 109, see FIGURE 25. The sequence then is to first release counting wheel 109 for its return to starting position under the action of spring 136 which will then elevate, momentarily at least, arm 161 to free rachet arm 151 which in turn will permit return movement of the dial shaft. With reference to FIGURE 20, it will be seen that ratchet arm 151 and its roller end 153 are so mounted as to permit clockwise rotation of the dial shaft 33 even when stop 157 is in place. Thus, while the dial shaft can not back up in locked position, it can be advanced. In the present construction as above noted, the parts may be freed up by advancing the dial shaft to its extreme clockwise position when the conventional dial stop arm 166, see FIGURES 1, 2 and 20, is advanced to the conventional dial stop 167.

With reference to FIGURES 20 and 25, it will be seen that the counting wheel 109 may be released by a clockwise rotation of lever 141, as above explained. This is here accomplished by a clockwise displacement of one end 168 of the lever, on the opposite side of its pivot pin 142. Lever end 168 is connected by pin 169 to one end 171 of a lever 172 pivoted at pin for pivotal movement of its opposite end 174. As will be seen from FIGURES 20 and 25, a counterclockwise displacement of lever end 174 will effect a freeing up of the counting wheel 109. This counterclockwise displacement of lever end 174 is effected by one end 176 of a link member 177 which is in turn pivoted at its opposite end 178 to an end 179 of a second link member 181 pivoted at its opposite end 182 to the frame post 42. With reference to FIGURE 20, it will be noted that link 181 is formed with a cam portion 183 which is positioned for engagement by the dial stop arm 166 when the latter is moved to adjacent stop 167. This engagement of the link member 181 by the dial stop member 166 causes link member 181 to move in a counterclockwise direction about its pivoted end 182, as suggested by arrow 184, and which in turn carries with it the link member 177, as suggested by arrow 186. This motion in turn draws link end 176 counterclockwise, as suggested by arrow 187, which carries lever end 174 in a counterclockwise direction, as suggested by arrow 188, so as to effect a release of the counting wheel 109, as above explained. Note that link end 176 is notched into a recess formed therefor in the adjacent lever end 174 and the parts are retained in engagement by spring 189.

As the counting wheel 109 is released, as above explained, it rotates rapidly back to its rest or home position under the influence of spring 136. Means is provided to permit a momentary overrun of the counting wheel so as to engage end 111 of lift arm 121 on an upslope 191 formed on the counting wheel 109 immediately adjacent the land 111. This momentary overrun and a return of the counting wheel to relocate arm 121 on land 111 is here accomplished by a stop 192 on the counting wheel, see FIGURE 25, which on return movement rotates against a compression spring 193 carried by a stationary spring rest 194. Thus, as the counting wheel rotates in a clockwise direction to its home position when released, stop 192 will engage spring 193 to permit an overrunning of the counting wheel sufficiently to cause a relative movement of the upslope 191 under the lift arm 121, thereby elevating the post 72 and releasing the stop 157 from behind the ratchet member 151. The compression of spring 193 will cause the small counterclockwise return movement of the counting wheel to its home or rest position. With reference to FIGURE 25, it will be seen that a coil type spring 196 is mounted on post 72 in compression between a shoulder 197 on the post and top disc 44. The ends of the spring are fastened to the shoulder and disc so as to provide a torsional as well as axial resilience. Accordingly, spring 196 here functions to both hold down the post 72 as well as to rotate the post to its normal rest position when the post is free to move to these positions.

The several cooperating parts above are positioned for operation, as illustrated in FIGURE 20, upon operation of the dial locking up mechanism, lever 158. As here shown, this lever has one end 198 which is displaced in a clockwise direction, as viewed in FIGURE 22, upon setting of the stop end 157, and this displacement of end 198 causes it to move an engaged end 199 of lever 201 having its opposite end 202 positioned in engagement with the pivotally connected ends 178 and 179 of link members 177 and 181. Lever 201 is pivoted intermediate its ends on pivot pin 203. With reference to FIGURES 20, 21, 22 and 23, it will be seen that the setting of the stop 157 is accomplished by a lateral displacement of lever end 199 causing a counterclockwise movement of lever 201 thereby displacing its end 202 against the pivotal connection of link members 177 and 181 thereby positioning the cam section 183 for engagement by the dial stop arm 166, as above described, and engaged link end 176 with lever end 174. The positioning of stop 157 to its locking position behind ratchet member 151 thus causes a displacement of the several parts from their positions illustrated in dashed line in FIGURE 20 to their positions as indicated in full line. Contrariwise, the action of the dial stop arm 166 on link member 181 in the unlocking operation will displace the parts from their full line position, as seen in FIGURE 20, to their dashed line positions. It will be noted that lever member 201 is retained stationary during the first phase of the unlocking operation by reason of the engaged position of lever ends 199 and 198. Accordingly, in this position the opposite end 202 of the lever forms a stationary guide for confining the sliding movement of link member 177 as it is drawn in a general counterclockwise direction, as suggested by the arrow 186, so as to effect a release of the counting wheel 109. When the counting wheel 109 returns to its home position, as above explained, lever 158 is released for movement by its spring 162 thereby permitting lever 201 to move to the position indicated in dash lines in FIGURE 20. This displacement of lever 201 is effected by spring 189 acting through link member 177, it being noted that link member 177 first moves generally longitudinally of its length so as to effect a release of the counting wheel which in turn effects a release of the outer end 199 of lever 201, following which lever 201 and link member 177 may move laterally, to the right, as viewed in FIGURE 20.

The cooperation of certain of the interrelated parts of the mechanism is illustrated in the schematic operational diagram, FIGURE 26. The several sequential operating steps are set out along the abscissa of the view and are labeled at the top of the view opposite the word sweep as rest, I, II, III, etc., corresponding to the position of rest of the parts and during the first, second, third, etc., sweeps of the dial. Next below on the figure and labeled "Drive A" is the correlated positions of arms 69 and 71, see FIGURES 3, 6 and 25. At position of rest these arms are in engagement, thereby engaging ratchet arm 61 in the teeth of ratchet wheel 63 for rotating wheel 63 and cam 77 on the ensuing first sweep of the dial. Note below on the view under the legend Drive B the correlated positions of arms **69*a* and 71*a* which show these arms also in engagement at the position of rest and at the start of the first sweep. In this view, arm 69 is characterized by a block 69 and arm 71 is characterized by a block 71. Similarly, blocks 69*a* and blocks 71*a* and 71*b* illustrate the corresponding parts of Drive B. Since these parts are all engaged at the beginning of the first sweep, the arm assemblies 81 and 81*a* are swung outwardly to an orbit corresponding to the first digit dialed. During the first sweep, however, it will be noted that blocks 71 and 71*a* and 71*b* moved up relative to blocks 69 and 69*a* so that at the end of sweep one, blocks 69 and 71 remained in engagement while block 71*a* raised above and separated from block 69*a*. The inter-relationship of gear 86 and dog 87 is similarly illustrated as well as gear 86*a* and dog 87*a*. In this connection, it will be noted that these gears and dogs are connected in the position of rest and during the first sweep so that the arm assemblies 81 and 81*a* are sent out to their orbit corresponding with the first digit dialed. However, it will be noted that dog 87 moves away from gear 86 at the beginning of the second sweep so that the arm assembly 81, cam 77, and gear 86 will rotate with the arm 81 in its orbit to a position corresponding to the second digit dialed. At the same time, it will be noted that arm 69***a* is not re-engaged with arm 71*a* at the end of the first sweep so that no rotation is imparted to gear 63*a* in the Drive B assembly during the second sweep. However, at the end of the second sweep, arm 69*a* is engaged by arm 71*b*, as illustrated in the drawing, so that during the third sweep gear 63*a* is again rotated. At the same time, it will be noted that dog 87*a* has moved up during the second sweep so as to release gear 86*a* for rotation during the third sweep. The cooperating relationship of gear 86 and ratcheting click member 163 and gear 86*a* and ratcheting click member 163*a* are similarly illustrated and the positions of the blocks illustrating these parts may be easily correlated with the description of the operation of these parts in the specification above. Conveniently illustrated also in FIGURE 26 are the corresponding positions of the lands 111–116 on the counting wheel which effect the vertical positioning of the several vertically displaceable parts 71, 87, 163, 71*a*, 71*b*, 87*a* and 163*a*.

We claim:

1. A telephone line selection mechanism comprising, a telephone dial journalled for rotation and means associated therewith for effecting a telephone line selection upon movement of said dial through a plurality of passes wherein each pass is composed of dial motion to and from a discreet number of circumferentially spaced positions, means for blocking motion of said dial, a device having a mechanical connection to and sensing the extent of rotation of said dial to said positions in one of said passes, and means activated by said device in at least one of said dial positions for activating said dial blocking means.

2. A telephone line selection mechanism comprising, a telephone dial journalled for rotation and means associated therewith for effecting a telephone line selection upon movement of said dial through a plurality of passes wherein each pass is composed of dial motion to and from a discreet number of circumferentially spaced positions, means for blocking motion of said dial, a first device having a mechanical connection to and sensing rotation of said dial in a first pass, a second device having a mechanical connection to and sensing rotation of said dial in a second pass, a third device having a mechanical connection to and sensing rotation of said dial in a third pass, and means activated by one of said devices in at least one of said dial positions for activating said dial blocking means.

3. A telephone line selection mechanism comprising, a telephone dial journalled for rotation and means associated therewith for effecting a telephone line selection upon movement of said dial through a plurality of motions to and from a discreet number of dial positions, locking means having positions locking and unlocking return movement of said dial, means having a mechanical connection to said dial and sensing dial motion to successive positions and being actuated by return dial motion from at least one of said dial positions to actuate said locking means, and dial unlocking means having a mechanical connection to said dial and formed and connected for operation upon a predetermined advance dial movement from locked position to displace said locking means to unlocking position.

4. A telephone line selection mechanism comprising, a telephone dial journalled for rotation and adapted for manual engagement and rotation through a plurality of cycles each composed of advance and return dial motions to and from a discreet number of dial positions, a dial shaft, electric pulsing means connected to said shaft for effecting telephone line selection determined by the dialing sequence of said positions, locking means mechanically connected to said shaft and having positions locking and unlocking return movement of said dial, a first device mechanically connected to said shaft and sensing rotation thereof in a first cycle and being connected to said locking means for displacement of the latter to locking position upon return dial motion from at least one of said dial positions, a second device mechanically connected to said shaft and sensing rotation thereof in a second cycle and being connected to said locking means for displacement of the latter to locking position upon return dial motion from at least one of said dial positions, a third device mechanically connected to said shaft and sensing rotation thereof in a third cycle and being connected to said locking means for displacement of the latter to locking position upon return dial motion from at least one of said dial positions, and dial unlocking means mechanically connected to said shaft and formed and connected for operation upon a predetermined advanced dial movement from locked position to displace said locking means to unlocking position.

5. A telephone line selection mechanism comprising, a telephone dial adapted for rotation through a plurality of cycles each composed of advance and return dial motions to and from a number of dial digits, a dial shaft, electric pulsing means connected to said shaft for effecting telephone line selection determined by the dialing sequence of said digits, a sweep device connected to said shaft and driven thereby to a series of advanced terminal positions during forward dial motion and returning to retracted position during return dial movement, means holding said device in terminal positions corresponding with permissive dialing and permitting return of said device from terminal positions corresponding with proscribed dialing, and means connected to said device for locking said shaft during return movement thereof accompanied by return movement of said device.

6. A telephone line selection mechanism comprising, a telephone dial adapted for rotation through a plurality of cycles each composed of advance and return dial motions to and from a number of dial digits, a dial shaft, electric pulsing means connected to said shaft for effecting telephone line selection determined by the dialing sequence of said digits, a sweep device connected to said shaft and driven thereby to a series of advanced terminal positions during forward dial motion in a first dialing cycle and returning to retracted position during return dial movement, means holding said device in terminal positions corresponding with permissive dialing in said first cycle and permitting return of said device from terminal positions corresponding with proscribed dialing, means connected to said shaft and causing said device to rotate therewith in an orbit determined by said terminal position during advance dial movement in a second dialing cycle to a series of second terminal positions corresponding with the digit dialed in said second cycle following a first permissive dialing cycle, means holding said device in second terminal positions corresponding with permissive dialing in said second cycle and permitting return of said device from second terminal positions corresponding with proscribed dialing, and means connected to said device for locking said shaft during return movement thereof accompanied by return movement of said device in both said first and second dialing cycles.

7. A telephone line selection mechanism comprising, a telephone dial adapted for manual rotation through a plurality of cycles each composed of advance and return dial motions to and from a number of dial digits, a dial shaft, electric pulsing means connected to said shaft for effecting telephone line selection determined by the dialing sequence of said digits, first and second sweep devices connected to said shaft each having first and second sequential sweep operation to terminal positions corresponding with digits dialed during sequential advance dial movements, means holding said devices in terminal positions corresponding with permissive dialing and permitting return of said devices from said terminal positions corresponding with proscribed dialing, means programming the first operation of said devices during advance dial movement in a first dialing cycle and second operation of said first device during advance dial movement in a second dialing cycle and the second operation of said second device during advance dial movement in a third cycle, and means connected to said devices for locking said shaft during return movement thereof accompanied by return movement of one of said devices in said first and second and third dialing cycles.

8. A telephone line selection mechanism as characterized in claim 7 and including means connected to said shaft and operated upon a predetermined advance dial movement from locked position for deactivating said last-named means to release said shaft for return dial movement.

9. A telephone line selection mechanism comprising, a telephone dial adapted for rotation through a plurality of cycles each composed of advance and return dial motions to and from a number of dial digits, a dial shaft, electric pulsing means connected to said shaft for effecting telephone line selection determined by the dialing sequence of said digits, a sleeve mounted on said shaft and having a frictional drive connection thereto, an arm having a pivotal connection to said sleeve eccentrically of said shaft and being spring biased to a retracted position, means connected to said shaft and causing said arm to move during the advance dial movements of sequential dialing cycles through a first sweep movement about said pivotal connection and a second sequential sweep movement concentric to said shaft, said arm moving in each of said sweep movements to terminal positions corresponding with digits dialed, means holding said arm in terminal positions corresponding with permissive dialing and permitting return of said arm from terminal positions corresponding with proscribed dialing, and means connected to said arm for locking said shaft during return movement thereof accompanied by return movement of said arm in said dialing cycles.

10. A telephone line selection mechanism comprising, a telephone dial adapted for rotation through a plurality of cycles each composed of advance and return dial motions to and from a number of dial digits, a dial shaft, electric pulsing means connected to said shaft for effecting telephone line selection determined by the dialing sequence of said digits, a sleeve mounted on said shaft and having a frictional drive connection thereto, first and second arms having pivotal connections to said sleeve eccentrically of said shaft and being spring biased to a retracted position, means connected to said shaft and causing said arms to move during the advance dial movement of sequential dialing cycles through a first sweep movement about said pivotal connections and a second sequential sweep movement concentric to said shaft, said arms moving in each of said sweep movements to terminal positions corresponding with digits dialed, means holding said arm in terminal positions corresponding with permissive dialing and permitting return of said arms from terminal positions corresponding with proscribed dialing, means programing the first sweep movement of said arms during advance dial movement in a first dialing cycle and said second sweep movement of said first arm during advance dial movement in a second dialing cycle and said second sweep movement of said second arm during advance dial movement in a third cycle, and means connected to said arms for locking said shaft during return movement thereof accompanied by return movement of said arms in said first and second and third dialing cycles.

11. A telephone line selection mechanism as characterized in claim 10 and including means connected to said shaft and operated upon a predetermined advance dial movement from locked position for deactivating said last-named means to release said shaft for return dial movement.

12. A telephone line selection mechanism comprising, a telephone dial adapted for rotation through a plurality of cycles each composed of advance and return dial motions to and from a number of dial digits, a dial shaft, electric pulsing means connected to said shaft for effecting telephone line selection determined by the dialing sequence of said digits, a sleeve mounted on said shaft and having a frictional drive connection thereto, an arm having a pivotal connection to said sleeve eccentrically of said shaft and being spring biased to a retracted position, means connected to said shaft and causing said arm to move the advance dial movement of sequential dialing cycles through a first sweep movement about said pivotal connection and a second sequential sweep movement concentric to said shaft, said arm moving in each of said sweep movements to terminal positions corresponding with digits dialed, a plate mounted parallel to said sweep movement, a pin carried by said arm and engaging said plate, said plate being formed with recesses in the paths of movement of said pin for engaging and holding said pin against return movement of said arm from terminal positions corresponding with permissive dialing, said recesses being omitted at terminal positions corresponding with proscribed dialing, and means connected to said arm for locking said shaft during return movement thereof accompanied by return movement of said arm in said dialing cycles.

13. A telephone line selection mechanism comprising, a telephone dial adapted for rotation through a plurality of cycles each composed of advance and return dial motions to and from a number of dial digits, a dial shaft, electric pulsing means connected to said shaft for effecting telephone line selection determined by the dialing sequence of said digits, a sleeve mounted on said shaft and having a frictional drive connection thereto, first and second arms having pivotal connections to said sleeve about axes parallel to but eccentrically spaced from said shaft and being spring biased to a retracted position, means connected to said shaft and causing said arms to move during the advance dial movement of sequential dialing cycles through a first sweep movement about said pivotal axes and a second sequential and coplanar sweep movement concentric to said shaft, said arms moving in each of said sweep movements to terminal positions corresponding with digits dialed, a pair of plates mounted parallel to said sweep movements of said arms, a pin carried by each of said arms, spring means biasing said pins into engagement with said plates, said plates being formed with recesses in the paths of movement of said pins for engaging and holding said pins against return movement of said arms from terminal position corresponding with permissive dialing, said recesses being omitted at terminal positions corresponding with proscribed dialing, means programing the first sweep movement of said arms during advance dial movement in a first dialing cycle and said second sweep movement of said first arm during advance dial movement in a second dialing cycle and said second sweep movement of said second arm during advance dial movement in a third cycle, means connected to said arms for locking said shaft during return movement thereof accompanied by return movement of said arms in said first and second and third dialing cycles, and means connected to said shaft and operated upon a predetermined advance dial movement from locked position for deactivating said last-named means to release said shaft for return dial movement.

14. A telephone line selection mechanism comprising, a telephone dial adapted for rotation through a plurality of cycles each composed of advance and return dial motions to and from a number of dial digits, a dial shaft, electric pulsing means connected to said shaft for effecting telephone line selection determined by the dialing sequence of said digits, a sleeve mounted on said shaft and having a frictional drive connection thereto, first and second arms having pivotal connections to said sleeve about axes parallel to but eccentrically spaced from said shaft and being spring biased to a retracted position, means connected to said shaft and causing said arms to move during the advance dial movement of sequential dialing cycles through a first sweep movement about said pivotal axes and a second sequential and coplanar sweep movement concentric to said shaft, said arms moving in each of said sweep movements to terminal positions corresponding with digits dialed, a pair of plates mounted parallel to said sweep movements of said arms, a pin carried by each of said arms, spring means biasing said pins into engagement with said plates, said plates being formed with recesses in the paths of movement of said pins for engaging and holding said pins against return movement of said arms from terminal positions corresponding with permissive dialing, said recesses being omitted at terminal positions corresponding with proscribed dialing, a counting wheel having a starting position and spring means biasing said wheel to starting position, means connected to said shaft for advancing and holding said starting wheel in successive steps corresponding with successive dial cycles, means connected to said counting wheel and programming the first sweep movement of said arms during advance dial movement in a first dialing cycle and said second sweep movement of said first arm during advance dial movement in a second dialing cycle and said second sweep movement of said second arm during advance dial movement in a third cycle, means connected to said counting wheel for releasing said arms and said counting wheel for return movement after completion of dialing, means connected to said arms for locking said shaft during return movement thereof accompanied by return movement of said arms in said first and second and third dialing cycles, and means connected to said shaft and operated upon a predetermined advance dial movement from locked position for deactivating said last-named means to release said shaft and arms and counting wheel for return movement to starting positions.

References Cited by the Examiner

UNITED STATES PATENTS

| | | | |
|---|---|---|---|
| 1,454,496 | 5/1923 | Vischer | 179—23 |
| 2,716,160 | 8/1953 | Pitt | 179—90 |
| 2,921,142 | 1/1960 | Tinus | 179—90 |
| 2,965,719 | 12/1960 | McClure | 170—27 |
| 3,055,984 | 9/1962 | Smith | 179—27 |

ROBERT H. ROSE, *Primary Examiner.*